United States Patent
Yong et al.

(10) Patent No.: US 8,477,600 B2
(45) Date of Patent: Jul. 2, 2013

(54) COMPOSITE TRANSPORT FUNCTIONS

(75) Inventors: Lucy Yong, McKinney, TX (US); T. Benjamin Mack-Crane, Downers Grove, IL (US); Linda Dunbar, Plano, TX (US); Robert Sultan, Somers, NY (US)

(73) Assignee: Futurewei Technologies, Inc., Plano, TX (US)

( * ) Notice: Subject to any disclaimer, the term of this patent is extended or adjusted under 35 U.S.C. 154(b) by 360 days.

(21) Appl. No.: 12/266,700

(22) Filed: Nov. 7, 2008

(65) Prior Publication Data

US 2009/0185569 A1 Jul. 23, 2009

Related U.S. Application Data

(60) Provisional application No. 61/022,091, filed on Jan. 18, 2008.

(51) Int. Cl.
*H04L 12/26* (2006.01)

(52) U.S. Cl.
USPC .......................................... 370/225; 370/217

(58) Field of Classification Search
USPC ................. 370/235, 420, 252, 389, 217, 218, 370/225, 230, 237, 395.31, 395.53, 228
See application file for complete search history.

(56) References Cited

U.S. PATENT DOCUMENTS

| 5,774,805 A | 6/1998 | Zicker | |
| 6,424,629 B1 * | 7/2002 | Rubino et al. | 370/241.1 |
| 6,859,842 B1 * | 2/2005 | Nakamichi et al. | 709/238 |
| 7,099,579 B2 * | 8/2006 | Sweeney et al. | 398/7 |
| 7,197,008 B1 * | 3/2007 | Shabtay et al. | 370/218 |
| 7,477,657 B1 * | 1/2009 | Murphy et al. | 370/468 |
| 2003/0105844 A1 * | 6/2003 | Hada et al. | 709/220 |

(Continued)

FOREIGN PATENT DOCUMENTS

| CN | 1221542 A | 6/1999 |
| CN | 1520199 A | 8/2004 |

(Continued)

OTHER PUBLICATIONS

International Telecommunication Union, "Characteristics of Synchronous Digital Hierarchy (SDH) Equipment Functional Blocks," Telecommunication Standardization Sector of ITU,G.783, Mar. 2006, 288 pages.

(Continued)

*Primary Examiner* — Dang Ton
*Assistant Examiner* — Mandish Randhawa
(74) *Attorney, Agent, or Firm* — Conley Rose, P.C.; Grant Rudolph; Rayhao Chung (57) ABSTRACT

A network comprising a first layer processor (LP) configured to distribute a plurality of component communications to a plurality of component connections using a distribution table comprising a plurality of component communication identifiers (CCIDs) and the component connection associated with each CCID, a second LP configured to collect the packets from the component connections, and a composite connection coupled to the first LP and the second LP, wherein the composite connection comprises a plurality of the component connections and is configured to transport the component communications using the component connections, and wherein the distribution table and composite connection are configured such that component communications associated with at least the same CCID of a component communication takes the same path from the first LP to the second LP as from the second LP to the first LP.

17 Claims, 3 Drawing Sheets

U.S. PATENT DOCUMENTS

| | | | |
|---|---|---|---|
| 2004/0037247 A1 | 2/2004 | Ngo | |
| 2004/0107382 A1* | 6/2004 | Doverspike et al. | 714/4 |
| 2004/0114511 A1* | 6/2004 | Mochizuki et al. | 370/217 |
| 2005/0083928 A1* | 4/2005 | Sivabalan et al. | 370/389 |
| 2005/0160171 A1* | 7/2005 | Rabie et al. | 709/227 |
| 2005/0249124 A1* | 11/2005 | Elie-Dit-Cosaque et al. | 370/242 |
| 2006/0146832 A1* | 7/2006 | Rampal et al. | 370/395.5 |
| 2006/0262728 A1* | 11/2006 | Addeo et al. | 370/248 |
| 2007/0258369 A1* | 11/2007 | Yamashima et al. | 370/230 |
| 2008/0049639 A1* | 2/2008 | Wiley et al. | 370/252 |
| 2008/0049777 A1* | 2/2008 | Morrill et al. | 370/420 |
| 2008/0279103 A1* | 11/2008 | Yong et al. | 370/235 |
| 2009/0034526 A1* | 2/2009 | Ahmadi et al. | 370/392 |
| 2009/0070808 A1* | 3/2009 | Jacobs | 725/36 |
| 2009/0168783 A1* | 7/2009 | Mohan et al. | 370/395.5 |
| 2009/0285090 A1* | 11/2009 | Allasia et al. | 370/221 |
| 2009/0304007 A1* | 12/2009 | Tanaka et al. | 370/395.53 |
| 2010/0040206 A1* | 2/2010 | DelRegno et al. | 379/32.01 |
| 2010/0246396 A1* | 9/2010 | Licardie et al. | 370/232 |

FOREIGN PATENT DOCUMENTS

| | | | |
|---|---|---|---|
| CN | 1675954 A | | 9/2005 |
| CN | 1925683 A | | 3/2007 |
| WO | 9912373 A1 | | 3/1999 |
| WO | WO 2008138265 A1 * | | 11/2008 |
| WO | WO 2009092316 A1 * | | 7/2009 |

OTHER PUBLICATIONS

International Telecommunication Union, "MPLS Layer Network Architecture," Telecommunication Standardization Sector of ITU, G.8110/Y.1370, Jan. 2005, 72 pgs.

Mack-Crane, T. Benjamin, et al., "Content Aware Connection Transport," U.S. Appl. No. 11/970,283, filed Jan. 7, 2008.

Foreign communication from a related counterpart application—International Search Report and Written Opinion, PCT/CN2009/070140, Apr. 16, 2009, 14 pages.

Bradner, S., "Key words for use in RFCs to Indicate Requirement Levels," BCP 14, RFC 2119, Mar. 1997.

S. Shenker, J. Wroclawski, "General Characterization Parameters for Integrated Service Network Elements," RFC 2215, Sep. 1997.

D. Awduche, L. Berger, D. Gan, T. Li, V. Srinivasan, G.Swallow, "RSVP-TE: Extensions to RSVP for LSP Tunnels," RFC 3209 Dec. 2001.

K. Kompella, et al., "Label Switched Paths (LSP) Hierarchy with Generalized Multi-Protocol Label Switching (GMPLS) Traffic Engineering (TE)," RFC 4206 Oct. 2005.

Pan, P., "Fast Reroute Extensions to RSVP-TE for LSP Tunnels," RFC 4090, May 2005.

Faucheur, Ed., "Protocol Extensions for Support of Diffserv-aware MPLS Traffic Engineering," RFC 4124. Jun. 2005.

Kompella, K., "Link Bundling in MPLS Traffic Engineering (TE)", RFC 4201, Oct. 2005.

Kompella, K. and S. Amante, "The Use of Entropy Labels in MPLS Forwarding", draft-kompella-mpls-entropy-label-01, Jul. 7, 2008.

Shiomoto, K. (Ed.) et al. "Procedures for Dynamically Signaled Hierarchical Label Switched Paths", draft-ietf-ccamp-lsp-hierarchy-bis-05.txt Oct. 16, 2008.

Meyer, M. Ed. et al., "MPLS Traffic Engineering Soft Preemption", draft-ietf-mpls-soft-preemption-16.txt, Feb. 2, 2009.

Yong, L. Ed, "Framework for MPLS Over Composite Link," draft-so-yong-rtgwg-c1-framework-00, Feb. 16, 2010.

L. Andersson, G. Swallow, "The Multiprotocol Label Switching (MPLS) Working Group decision on MPLS signaling protocols." RFC 3468, Feb. 2003.

Stein, Y, "PW Bonding", draft-stein-pwe3-pwbonding-01.txt; Nov. 2, 2002.

Katz, D., "Traffic Engineering (TE) Extension to OSPF Version 2", RFC 3630, Sep. 2003.

G. Apostolopoulos, S. Kama, D. Williams, R. Guerin, A. Orda, T. Przygienda, "QoS Routing Mechanisms and OSPF Extensions," RFC 2676, Aug. 1999.

ITU-T G.800, "Unified functional architecture of transport networks," Sep. 2007.

Shiomoto, K. (Ed.) et al. "Procedures for Dynamically Signaled Hierarchical Label Switched Paths", draft-ietf-ccamp-lsp-hierarchy-bis-02.txt; Apr. 26, 2007.

Meyer, M. Ed. et al., "MPLS Traffic Engineering Soft Preemption", draft-ietf-mpls-soft-preemption-13.txt, Sep. 22, 2008.

Meyer, M. Ed. et al., "MPLS Traffic Engineering Soft Preemption", draft-ietf-mpls-soft-preemption-08.txt, Oct. 2006.

Stein, Y, "PW Bonding", draft-stein-pwe3-pwbonding-00.txt; Jun. 25, 2008.

Kamite, Y., Jounay, F., Niven-Jenkins, B., Brungard, D., and L. Jin, "Framework and Requirements for Virtual Private Multicast Service (VPMS)", draft-ietf-l2vpn-vpms-frmwk-requirements-03, Jul. 2010.

Awduche, D., Malcolm, J., Agogbua, J., O'Dell, M., and J. McManus, "Requirements for Traffic Engineering Over MPLS", RFC 2702, Sep. 1999.

Rosen, E., Viswanathan, A., and R. Callon, "Multiprotocol Label Switching Architecture", RFC 3031, Jan. 2001.

Nagarajan, A., "Generic Requirements for Provider Provisioned Virtual Private Networks (PPVPN)", RFC 3809, Jun. 2004.

Carugi, M. and D. McDysan, "Service Requirements for Layer 3 Provider Provisioned Virtual Private Networks (PPVPNs)", RFC 4031, Apr. 2005.

Rosen, E. and Y. Rekhter, "BGP/MPLS IP Virtual Private Networks (VPNs)", RFC 4364, Feb. 2006.

Andersson, L. and E. Rosen, "Framework for Layer 2 Virtual Private Networks (L2VPNs)", RFC 4664, Sep. 2006.

Augustyn, W. and Y. Serbest, "Service Requirements for Layer 2 Provider-Provisioned Virtual Private Networks" ,RFC 4665, Sep. 2006.

Kompella, K. and Y. Rekhter, "Virtual Private LAN Service (VPLS) Using BGP for Auto-Discovery and Signaling", RFC 4761, Jan. 2007.

Lasserre, M. and V. Kompella, "Virtual Private Lan Service (VPLS) Using Label Distribution Protocol (LDP) Signaling", RFC 4762, Jan. 2007.

Rekhter, Y., Bonica, R., and E. Rosen, "Use of Provider Edge to Provider Edge (PE-PE) Generic Routing Encapsulation (GRE) or IP in BGP/MPLS IP Virtual Private Networks", RFC 4797, Jan. 2007.

Bitar, N., Bocci, M., and L. Martini, "Requirements for Multi-Segment Pseudowire Emulation Edge-to-Edge (PWE3)", RFC 5254, Oct. 2008.

Bryant, S., Filsfils, C., Drafz, U., Kompella, V., Regan, J., and S. Amante, "Flow Aware Transport of Pseudowires over an MPLS PSN", draft-ietf-pwe3-fat-pw-03, Jan. 2010.

IEEE Standards Association, "IEEE Std 802.1AX-2008 IEEE Standard for Local and Metropolitan Area Networks—Link Aggregation", 2006, <http://standards.ieee.org/getieee802/download/802.1AX-2008.pdf>.

ITU-T, "Internet protocol data communication service—IP packet transfer and availability performance parameters", 2007, <http://www.itu.int/rec/T-REC-Y.1540/en>.

ITU-T, "Network performance objectives for IP-based services", 2006, <http://www.itu.int/rec/T-REC-Y.1541/en>.

Sklower, K., Lloyd, B., McGregor, G., and D. Carr, "The PPP Multilink Protocol (MP)", RFC 1717, Nov. 1994.

Blake, S., Black, D., Carlson, M., Davies, E., Wang, Z., and W. Weiss, "An Architecture for Differentiated Services", RFC 2475, Dec. 1998.

Malis, A. and W. Simpson, "PPP over SONET/SDF", RFC 2615, Jun. 1999.

Thaler, D. and C. Hopps, "Multipath Issues in Unicast and Multicast Next-Hop Selection", RFC 2991, Nov. 2000.

Hopps, C., "Analysis of an Equal-Cost Multi-Path Algorithm", RFC 2992, Nov. 2000.

Grossman, D., "New Terminology and Clarifications for Diffserv", RFC 3260, Apr. 2002.

Kent, S. and K. Seo, "Security Architecture for the Internet Protocol", RFC 4301, Dec. 2005.

Bryant, S., Swallow, G., Martini, L., and D. McPherson, "Pseudowire Emulation Edge-to-Edge (PWE3) Control Word for Use over an MPLS PSN", RFC 4385, Feb. 2006.

Swallow, G., Bryant, S., and L. Andersson, "Avoiding Equal Cost Multipath Treatment in MPLS Networks", BCP 128, RFC 4928, Jun. 2007.

Kamite, Y., Jounay, F., Niven-Jenkins, B., Brungard, D., and L. Jin, "Framework and Requirements for Virtual Private Multicast Service (VPMS)", draft-ietf-I2vpn-vpms-frmwk-requirements-02, Oct. 31, 2008.

Bitar, N., Bocci, M., and L. Martini, "Requirements for Multi-Segment Pseudowire Emulation Edge-to-Edge (PWE3)", draft-ietf-pwe3-ms-pw-requirements-07, Jun. 2007.

"Cisco ONS 15454 Reference Manual," Product and Documentation Releases 9.1, 9.2, and 9.2.1, Jan. 2011.

Rosen, E., et al., "MPLS Label Stack Encoding," RFC 3032, Jan. 2001, 22 pages.

Bryant, S., et al., "Pseudo Wire Emulation Edge-To-Edge (PWE3) Architecture," RFC 3985, Mar. 2005, 43 pages.

Anderson, L., et al., "LDP Specification", RFC 5036, Oct. 2007, 127 pages.

* cited by examiner

FIG. 5

COMPOSITE TRANSPORT FUNCTIONS

CROSS-REFERENCE TO RELATED APPLICATIONS

This application claims priority to U.S. Provisional Patent Application No. 61/022,091 filed Jan. 18, 2008 by Lucy Yong, et al. and entitled, "Composite Transport Functions," which is incorporated by reference herein as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Various connection transport technologies have been developed in standards and deployed in networks. Examples of these connection transport technologies include time division multiplexed (TDM) circuits, such as Synchronous Digital Hierarchy (SDH) and Plesiochronous Digital Hierarchy (PDH), and packet virtual circuits, such as Frame Relay and X.25. Generally, these technologies create a connection comprising a single transport channel extending between two points in the network. Specifically, the connection is a series of links providing a single path that carries client packets. The client packets are transported along the connection such that the packets are delivered to the egress port in the same order as received at the ingress port. In addition, the connection transports these packets without any visibility into or knowledge of the packets' contents.

Traffic engineering enables service providers to optimize the use of network resources while maintaining service guarantees. Traffic engineering becomes increasingly important as service providers desire to offer transport services with performance or throughput guarantees. The single path nature of traditional connections limits the ability of the network operator to engineer the traffic in the network. Specifically, traffic engineering activities may be limited to the placement of large-capacity edge-to-edge tunnels, which limits the network operator's flexibility. Additional flexibility may be obtained by creating additional tunnels and using additional client layer functions to map client traffic to these tunnels. However, this may require each tunnel's primary and backup route to be reserved and engineered from edge-to-edge, which may make link capacity optimization awkward and complex.

SUMMARY

In one aspect, the disclosure includes a network comprising a first layer processor (LP) configured to distribute a plurality of component communications to a plurality of component connections using a distribution table comprising a plurality of component communication identifiers (CCIDs) and the component connection associated with each CCID, a second LP configured to collect the packets from the component connections, and a composite connection coupled to the first LP and the second LP, wherein the composite connection comprises a plurality of the component connections and is configured to transport the component communications using the component connections, and wherein the distribution table and composite connection are configured such that component communications associated with at least the same CCID component communication takes the same path from the first LP to the second LP as from the second LP to the first LP.

In another aspect, the disclosure includes a method comprising defining a time window, measuring a traffic rate during the time window, and calculating a bandwidth rate for a component communication when a bandwidth profile for the component communication does not exist.

In an additional aspect, the disclosure includes a network component comprising at least one processor configured to implement a method comprising assigning a plurality of component communications to a plurality of component connections in a composite connection, identifying a fault in one of the component connections, and transferring at least some of the component communications assigned to the faulty component connection to a bypass connection, wherein the bypass connection is not part of the composite connection.

In yet another aspect, the disclosure includes a network comprising an ingress LP configured to distribute a plurality of component communications to a plurality of component connections, a composite connection coupled to the ingress LP and comprising a plurality of the component connections and a plurality of intermediate nodes, wherein the composite connection is configured to transport the component communications using the component connections and the intermediate nodes, an egress LP coupled to the composite connection and configured to receive the component communications from the component connections, and a management entity in communication with the ingress LP, the egress LP, the intermediate nodes, or combinations thereof, wherein upon detection of a fault in one of the component connections, the component connection does not generate any alarm indication signals (AISs) from the intermediate nodes.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems, methods, or both may be implemented using any number of techniques, whether currently known or in existence. The disclosure should in no way be limited to the illustrative implementations, drawings, and techniques illustrated below, including the examples of designs and implementations illustrated and described herein, but may be modified within the scope of the appended claims along with their full scope of equivalents.

Disclosed herein is an enhanced connection transport network. Specifically, the connection transport network provides an improved LP that can measure the bandwidth of component communications that do not have a bandwidth profile. The LPs are also configured with a distribution table. The distribution table may be used to distribute the component communications to the component connections in a composite connection. The distribution table may be configured such that the component communications associated with a single CCID or a group of CCIDs may follow the same path through the network regardless of which direction the component communication is traveling through the composite connection. The LPs also perform alarm signal handling such that a single AIS is sent to the component communication end points when composite connection can not forward the component communications. Finally, the network is configured with a bypass connection that is outside of the composite connection, which allows the LPs to move a component communication from the composite connection to the bypass route when the composite connection experiences a fault. Such features enhance the functionality and resiliency of the transport network.

The enhanced connection transport network described herein implements many types of connections. As used herein, a "connection" is a transport channel that has at least one ingress point and at least one egress point, wherein packets received at the ingress points are transported to all the egress points. A connection may be a single link connection or may be a path that traverses several links and nodes (a serial compound link connection). The connection may be implemented using switching functions to provision port-to-port mappings between the various links or paths. Generally, the packets that are transported along a single connection follow the same path through the network such that each packet traverses the same links along the path from the ingress points to the egress points. However, an exception may exist in cases where the connection comprises a plurality of parallel link connections or component connections. Such is the case with the composite connection described herein.

Figure 1:
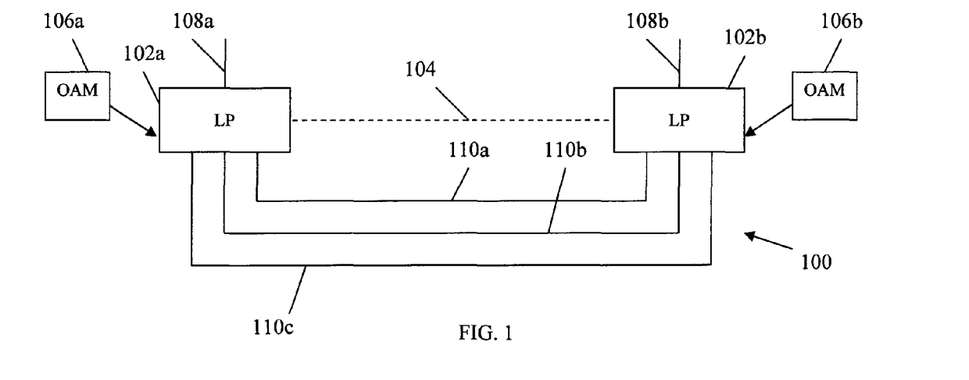
FIG. 1 is a schematic diagram of an embodiment of a network.

FIG. 1 is a schematic diagram of an embodiment of an enhanced connection transport network 100. The network 100 comprises an ingress LP 102a and an egress LP 102b (collectively, 102) coupled to each other via a composite connection 104. The ingress LP 102a is configured to receive a connection carrying a composite communication comprising a plurality of component communications, e.g. client communications, on an ingress connection port 108a, and transport the composite communication to the egress LP 102b using the composite connection 104. Although the network 100 may view the composite connection 104 as a single connection, the composite connection 104 may comprise a plurality of parallel component connections 110a, 110b, and 110c (collectively, 110). Thus, the ingress LP 102a may distribute the composite communication across the various component connections 110. The component connections 110 transport the component communications to the egress LP 102b, where the component communications are merged into the composite communication, which is transmitted on an egress connection port 108b. If desired, the network 100 may also comprise operation, administration, and maintenance (OAM) modules 106a and 106b (collectively, 106) coupled to the ingress and egress LPs 102, which may be configured to communicate the status of the component connections 110 at each end of composite connection. Other embodiments of the network 100 are disclosed in U.S. patent application Ser. No. 11/769,534 filed Jun. 27, 2007 by Lucy Yong et al., entitled "Network Availability Enhancement Technique for Packet Transport Networks" and U.S. patent application Ser. No. 11/970,283 filed Jan. 7, 2008 by T. Benjamin Mack-Crane et al., entitled "Content Aware Connection Transport", both of which are incorporated herein by reference as if reproduced in their entirety.

The LPs 102 may be processors or functionality that exist at the ingress and egress of the composite connection 104. Specifically, the LP 102 may be a part of any device, component, or node that may produce, transport, and/or receive connections carrying composite communications, for example, from ingress connection port 108a or from other nodes. In a specific embodiment, one or both of the LPs may be composite transport group (CTG) ingress and/or egress points. Typically, the LPs 102 will be implemented at the edge nodes within a network or two nodes that connect each other by multiple physical links, but the LPs 102 may also be implemented at other locations as well. In some embodiments, the LPs 102 may be functionality built into an existing forwarding function, such as a switching fabric or a line card. As described below, the LPs 102 may distribute the packets in the composite communication over the composite connection 104 based on a CCID in the packets. This enables the LPs 102 to distribute packets across multiple resources or queues, e.g. the component connections 110, thereby enabling traffic engineering without reordering packets belonging to any component communication or adding any additional information to the packets. The LPs 102 may be part of a packet transport node such as those contained in a multi-protocol label switching (MPLS) network, an Institute of Electrical and Electronic Engineers (IEEE) 802.1 provider backbone bridged-traffic engineered (PBB-TE) network, or other connection-oriented packet networks. Alternatively, the LPs 102 may reside on customer premise equipment (CPE) such as packet voice private branch exchange (PBX), video service platform, and Web server.

The composite connection 104 may be distinguished from the component connections 110 by the order of the data that they carry. Specifically, the term "composite connection" may refer to a virtual connection between two points that is configured to transport the composite communication using a specified bandwidth or quality of service (QoS), but that does not necessarily transport the packets within the composite communication along the same path or route. In contrast, the term "component connection" may refer to one of a plurality of links, connections, paths, or routes within a composite connection that preserves the order of packets transported therein. The component connections 110 are sometimes referred to as component link connections, and specifically include individual link connections and serial compound link connections. The composite connection 104 may be referred to as a CTG and may include maintenance points modeled as a sub-layer function that terminates at the LPs 102. These maintenance points may generate or receive maintenance messages over the component connections 110, which may be filtered to the maintenance termination points.

In an embodiment, there may be multiple layers of composite connections 104. For example, a composite connection 104 may comprise a plurality of component connections 110, one of which comprises a second composite connection that comprises a plurality of second component connections. For example, the second composite connection may be an aggregated link at some point along the path of one component connections 110 in the composite connection 104. In such a case, the composite communication carried by the second composite connection may be distributed across the various parallel links (the second component connections) and merged for further transport along the component connection 110 belonging to the composite connection 104.

Connections carrying composite communications are received from or transmitted to other networks or entities via the connection ports 108. As used herein, the term "connection port" may refer to an ingress or egress into a network comprising a composite connection upon which a composite communication is sent or received. The connection port 108 may be a connection as defined herein, or may simply be a port or other component coupling the network 100 to another network or entity. While the network 100 may comprise a single ingress connection port 108a and a single egress connection port 108b as shown in FIG. 1, the network 100 may also comprise a plurality of ingress and egress connection ports 108 coupled to LPs 102. In such a case, each composite communication may be associated with one pair of ingress and egress connection ports 108.

The composite communication may be any set of packets or messages that needs to be transported across the network. Specifically, the term "composite communication" may refer to a set of data streams that is received by a network in a specified order and that is transmitted from the network in some order, but that need not maintain the same order that is received as long as individual component communication orders are preserved. The composite communication is typically associated with a service level agreement (SLA) that specifies a minimum transport capacity, QoS, or other criteria for transporting the component communications whose packet order is to be maintained through the network. For example, the composite communication may be stream of Ethernet packets, wherein the QoS is specified within the header of the packet or frame.

The composite communication comprises a plurality of component communications. Specifically, the term "component communication" may refer to a plurality of packets that are associated with each other. The component communication may be a subset of a composite communication, and the packets within a component communication may have a substantially identical CCID or will otherwise be identified as belonging to the same component communication. When a component communication is transported along a component connection 110, the component communication may maintain its order as it is transported across the network 100. The composite communication and the component communication may each be referred to as service instances.

The packets in the composite communication may contain a CCID. As used herein, the term "CCID" may refer to information in the packet that associates the packet with other packets in a component communication. The CCID may be a fixed point in the packets in that its value and position is the same for any packet in a given component communication, and may also be referred to as a communication distinguishing fixed point (CDFP). Examples of CCIDs include communication identifiers, service instance identifiers, sender and receiver identifiers, traffic class identifiers, packet QoS level identifiers, packet type identifiers, Internet Protocol version 6 (IPv6) flow labels, and other such information in the packet header. One specific example of a CCID is the MPLS pseudowire inner label, which identifies each client pseudowire within an outer tunnel (connection) used for transport. Another specific example of a CCID is an Ethernet backbone service instance identifier (I-SID), which identifies the individual service instances carried over a backbone tunnel or virtual local area network (VLAN). The CCID may also be client-encoded information. In such cases, the client information format may need to be known. For example, if the network is an Ethernet transport network and it is known that the client uses Internet Protocol (IP), then the CCID may include the IP source and destination addresses, thereby distinguishing finer granularity component communications. In an embodiment, the CCID is included in the packets when the packets enter the network such that the network components described herein do not have to add the CCID to the packets. Alternatively, the LPs 102 can add the CCIDs to the packets upon entering into the network 100, and remove the CCIDs from the packets prior to exiting from the network 100.

The network 100 may also comprise an OAM module 106. The OAM module 106 may monitor the connectivity, performance, or both of the various connections and links within the network 100, and may do so at any of the composite connection points, component connection points, or both. The OAM module 106 may detect a full or partial fault in the composite connection 104, the component connections 110, or both. The OAM module 106 may also communicate the state of the component connections 110 to the LPs 102.

In an embodiment, the ingress LPs are configured with or have access to a distribution table. The distribution table may be stored in the LP or at a remote location, and may indicate the component connection that should be used to transport each component communication. In some embodiments the distribution table may only contain two columns: the list of CCIDs and the component connection associated with each CCID. Alternatively, the distribution table may be expanded to provide the LP with additional functionality. For example, in addition to the component communication's primary component connection, the distribution table may also indicate a primary component connection capacity threshold, a secondary component connection, and a secondary component connection capacity threshold. The secondary component connection may be a designated backup component connection associated with the component communication. The (primary or secondary) connection capacity threshold may be a point at which the component communication should be moved to another component connection, for example 100 megabits per second (Mbps) or 80 percent. Table 1 below is an example of a distribution table comprising the CCID, the primary component connection, the primary component connection capacity threshold, the secondary component connection, and the secondary component connection capacity threshold, where the component connections are distinguished using the letters A, B, and C.

TABLE 1

| CCID | Primary Component Connection | Primary Component Connection Capacity Threshold | Secondary Component Connection | Secondary Component Connection Capacity Threshold |
|---|---|---|---|---|
| I1 | A | — | — | — |
| I2 | A | 80 Mbps | — | — |
| I3 | B | 80 Mbps | A | — |
| I4 | C | 50 Mbps | A | 50 Mbps |
| I5 | B | 80 Mbps | A | 50 Mbps |
| I6 | A | 20 Mbps | B | 50 Mbps |
| I7 | C | 100 Mbps | B | 50 Mbps |
| I8 | C | 20 Mbps | B | 50 Mbps |
| I9 | C | 0 Mbps | A | 50 Mbps |
| I10 | B | 0 Mbps | C | 0 Mbps |

As shown in Table 1, some component communications, e.g. I1, may have a primary component connection, but no designated primary component connection capacity threshold, secondary component connection, or secondary component connection capacity threshold. Other component communications, e.g. I2, may have a primary component connection and a primary component connection capacity threshold, but no designated secondary component connection or secondary component connection capacity threshold. Still other component communications, e.g. I3, may have a primary component connection, primary component connection capacity threshold, and secondary component connection, but no designated secondary component connection capacity threshold. Alternatively, some of the component communications may have low or zero primary and/or secondary component connection capacity thresholds, indicating that they should remain on their component connections until the connection capacity is reduced to the low level or eliminated.

When creating the distribution table, the LP or management entity may need some information regarding the size of the component connections and the expected size of each component communication. The bandwidth capacity of the component connections may be static but can be modified, and is typically known by the LP and/or management entity. The expected size of the component communications are typically provided in a bandwidth profile. The bandwidth profile may specify the amount of traffic that will be transported across the network, e.g. in Mbps, or the amount of bandwidth that needs to be reserved for the client's traffic. Once such information is obtained, the distribution table may be created such that the component communications do not overload any component connections under normal operating conditions.

The distribution table described above allows policy decisions to be made regarding which component communications will be blocked if multiple faults reduce the available capacity below that sufficient to carry all protected traffic. Providing such to a policy enforcement function can reduce the time required to recover from the fault, which can be an important factor in packet transport services. However, if the distribution table attempts to cover all possible failure scenarios, the table may become quite large, which consumes memory and may lead to longer recovery times. To balance these considerations, it may be preferable to have one table that contains the primary failure scenario and other tables that contain the backup failure scenarios. The tables may also specify what to do if additional failures occur, e.g. to provide a complete, deterministic policy. Some communications may be blocked (disconnected) under such conditions.

The distribution policy decision function may be a separate entity from the policy enforcement functions. The distribution policy decision function can reside in a management entity or it may be co-located with one of composite connection policy enforcement functions in a network component. For a composite link connection, i.e. a composite connection over a composite link, a transport plane link protocol, such as Ethernet link layer discovery protocol (LLDP), may be used to carry the distribution table information. Generalized MPLS (GMPLS) resource reservation protocol (RSVP) is designed as control plane protocol, and thus the RSVP signaling protocol may be used to communicate between the policy decision function and policy enforcement functions.

In some embodiments, the bandwidth profile may not be available for some component communications. Such may be the case when the client does not provide a bandwidth profile. When there is no bandwidth profile available for a component communication, the LP may implement an automatic bandwidth measurement method. The automatic bandwidth measurement method may be applied to a component communication or a group of component communications (including those with existing bandwidth profiles) as needed, and may be turned on or off as desired. In some cases, the automatic bandwidth measurement method may be applied to a plurality of component communications, particularly when the individual component communications are small and/or it is desirable to treat the plural component communications as an individual component communications for traffic engineering purposes.

Figure 2:
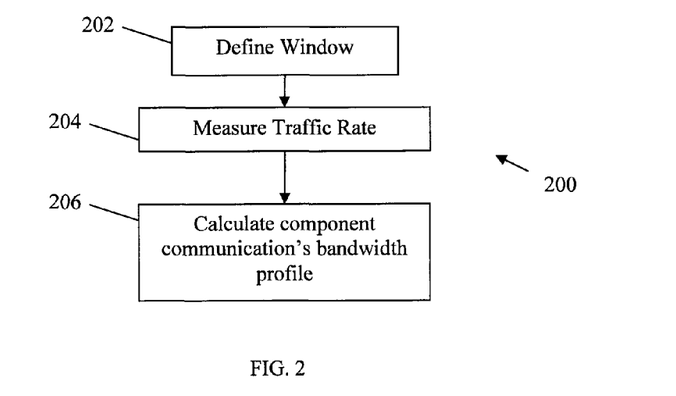
FIG. 2 is a flowchart of an automatic bandwidth measurement method.

FIG. 2 illustrates an embodiment of the automatic bandwidth measurement method 200. The method 200 allows an estimated bandwidth profile to be created for a component communication or a group of component communications. The method 200 may be implemented by an ingress LP or any other network component. The method may begin at 202 where a window is defined. The window may be any duration sufficiently long to capture a representative sample of the component communication packet flow, such as about 100 milliseconds. In addition, the window may be sufficiently long so as to smooth any bursts in the client traffic. The method 200 may then proceed to 204 where the component communication traffic rate is measured. More specifically, the total amount of component communication traffic flowing into the LP during the window is measured, for example in megabits. The packets within the component communication may be identified by the CCID that can be the source media access control (MAC) address, the destination MAC address, VLAN, any other fields within the packets, or combinations thereof. The method 200 may then proceed to 206 where the component communication's bandwidth profile is calculated. Specifically, the total amount of component communication traffic during the window may be divided by the window size, thereby creating a bandwidth profile. The bandwidth profile may then be used in component connection selection. In some embodiments, the method 200 may be implemented on a periodic basis and the distribution table subsequently updated as needed. The method 200 could also compute the results from multiple iterations into a mean or median bandwidth profile, and use such as the bandwidth profile for a period. In any event, the method 200 can be implemented in real-time, e.g. as the component communications pass through the LP.

In some cases, a bandwidth profile may be unnecessary. For example, IP control protocol data units (PDUs) have low packet rates, which may be insignificant compared with the other component communications' data rates. Thus, the processing burden in measuring the bandwidth may exceed the benefit obtained by doing so. Moreover, such component communications may not occupy much transport capacity, so the traffic engineering function may not be necessary. In such cases, rather than measuring the bandwidth, these kinds of communication can be put on one component connection or sent over several component connections by hashing on all or part of the packets' header. Such may reduce the processing burden on the LP.

In some embodiments, it may be desirable for bi-directional client traffic to follow the same path when flowing in two directions between the two LPs. Specifically, it may be desirable for client traffic to flow through the exact same nodes when going from LP A to LP B as it does when flowing from LP B to LP A. In an embodiment, the component connections are bi-directional along the same path. In such a case, the traffic from LP A to LP B travels along the component connection in one direction and traffic from LP B to LP A travels along the component connection in the reverse direction. In addition, the distribution tables at LPs A and B, e.g. the ingress and egress LPs, may be configured such that traffic with the same CCID travels over the same component connection. In such cases, one LP may be designated as the master, while the other LP is designated as the slave. The master LP may configure and update the distribution table, and may forward the distribution table to the slave, e.g. using a control plane or the composite connection. In a specific embodiment, one distribution policy decision function may exist, and each composite connection ingress LP may comprise a policy enforcement function that provides the desired distribution.

A fault may cause an alarm indication signal (AIS) to be signaled to client traffic end points in a network. For example, a fault or partial fault along a component connection may cause AISs for client traffic at the nodes on either side of the fault, as well as at the ingress and/or egress LP. Since the LP can select other component connections for the client traffic, such AISs should not propagate to the client traffic end points. Thus the LP may comprise an enhanced AIS processing function. For example, upon notification of a fault or repair of a component connection, the ingress LP would evaluate all the rows in the table to determine whether each component communication is mapped to its primary, secondary, or no component connection and at the appropriate rate, e.g. using the distribution table shown above. If required, the composite connection LP may modify the component communication allocations. The ingress LP may then create a single AIS for the component communications to which the LP cannot allocate a component connection, as opposed to an AIS being created by each component connection. In some embodiments, the AIS may only be generated if the ingress LP has to drop some frames from one or more component communications. In other words, no AIS may be generated or a low-priority AIS may be generated if the component communications can be rerouted over the other component connections without dropping any frames. Such a configuration differs from other configurations in that other systems' component connections may generate an AIS for each component communication that is affected by the fault. In addition, the AIS is raised by a upstream LP in the present system, e.g. the node sending packets, rather than the downstream LP, e.g. the node receiving packets because the upstream LP determines which component communication is blocked. Such a feature may require one or more of the downstream or egress nodes to disable any existing AIS functionality for the component connection. Finally, the distribution algorithm may not need to consider the AIS message for traffic engineering purposes because the AIS message takes very small portion of link capacity. When all the component connections fail, the downstream LP will need to generate an AIS for all the component communications, e.g. broadcast AISs to all component communications.

Figure 3:
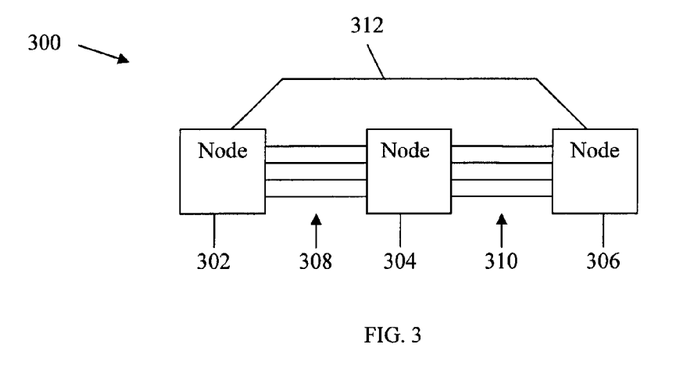
FIG. 3 is a schematic diagram of another embodiment of a network.

In some embodiments, the LP may specify one or more paths or connections to use as a backup path in case of a full or partial fault. Specifically, the LP may select a path or connection that is outside of the composite connection to use as the backup path. FIG. 3 illustrates an example of such a network 300. Specifically, the network 300 comprises an ingress node 302, an intermediate node 304, and an egress node 306, which may each comprise the LPs described above. The ingress node 302, intermediate node 304, and egress node 306 are connected together as shown in FIG. 3 using a first composite connection 308, a second composite connection 310, and a bypass connection 312. The bypass connection 312 may serve as a backup connection for the composite connections 308, 310. Specifically, the ingress node 302 may reroute component communications to the egress node 306 when a partial or complete failure of one of the composite connections 308, 310 occurs or if other, higher-priority traffic causes the traffic to be blocked at the ingress node 302. In such cases, the ingress node 302 can quickly reroute the affected traffic to the bypass connection 312, a process referred to as fast reroute (FRR). In some embodiments, the FRR may be transparent to end users or applications. In addition, FRR may take less than or about 50 milliseconds to occur, which is competitive with synchronous optical network (SONET) automatic protection switching (APS). In an embodiment, the FRR may utilize MPLS label stacking with RSVP signaling to create a backup tunnel around the link or node that needs to be protected. In some instances, assigning bandwidth for the bypass connection 312 may consume a significant amount of network capacity because a separate bypass connection 312 may be created for each link and node. However, such may be necessary to prevent congestion in the bypass connection 312 when a fault occurs in the composite connections 308, 310. Finally, the FRR described herein may be used in conjunction with any protection schemes that exist within the composite connections 308, 310, for example in composite connection 308 between the ingress node 302 and the intermediate node 304.

Figure 4:
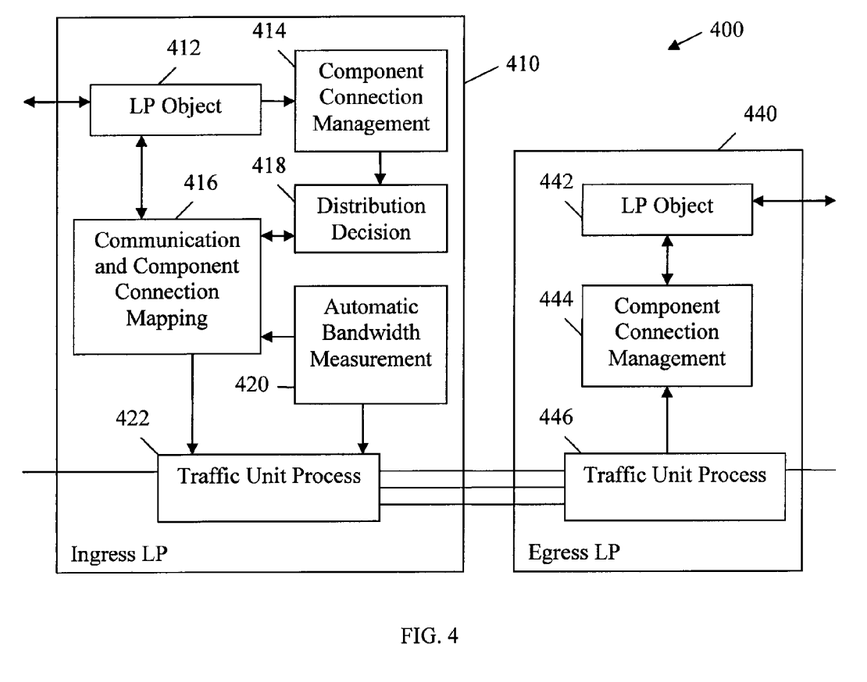
FIG. 4 is a schematic diagram of the ingress and egress LPs.

FIG. 4 illustrates an embodiment of a network 400 comprising an ingress LP 410 and an egress LP 440. One ingress LP 410 and one egress LP 440 may be paired at one place to form a bi-directional composite connection. The ingress LP 410 may comprise a LP object 412, which may interface with a management entity and/or LP manager via a LP manager interface. The LP object 412 may coordinate communications between the management entity and/or LP manager and other components within the ingress LP 410. The LP object 412 may communicate with a component connection management module 414, which may manage the component connections. The component connection management module 414 may communicate with a distribution decision module 418, which may decide how to distribute the component communications to the component connections. In an embodiment, the distribution decision module 418 may comprise a policy based algorithm. The algorithm takes component communication bandwidth (provisioned or measured) and component connection available capacity into account to minimize the packet dropping. The LP object 412 and the distribution decision module 418 may communicate with a communication and component connection mapping module 416 that comprises the distribution table described herein to input, output, or remove the mapping items from the table. A traffic unit process 422 identifies component communication from packets and selects the appropriate component connection for packet forwarding based on the mapping in the module 416. A composite communication or component communication automatic bandwidth measurement module 420 may perform the automatic bandwidth measurement described herein and may communicate such to the traffic unit process 422 and the communication and component connection mapping module 416.

The egress LP 440 may comprise a LP object 442, which may interface with a management entity and/or LP manager via a LP manager interface. The LP object 442 may coordinate communications between the management entity and/or LP manager and other components within the egress LP 440. The LP object 442 may communicate with a component connection management module 444, which may manage the component connections. The traffic unit process 446 may inspect the received packets from all component connections and send all OAM packets described herein to component connection management. The component connection management module 444 may perform the OAM function and may generate some upstream OAM packets through one of component connections in the reverse direction. When component connection management module 444 received a notice about a fault on a component connection by either signal failure (SF) from its near end or remote defect indication (RDI) from the far end, it will make the component connection in "out of service" state. Upon this condition, the traffic unit process unit 446 will drop all the packets received from this component connection. This will prevent packets belonging to the same component communication from out of sequences because the LP ingress may forward the component communication on another component connection.

Figure 5:
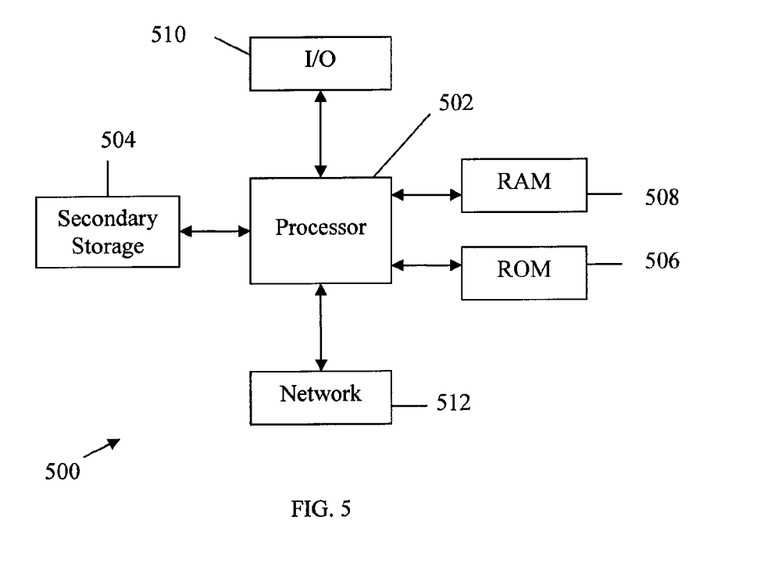
FIG. 5 is a schematic diagram of one embodiment of a general-purpose computer system.

The network described above may be implemented on any general-purpose network component, such as a computer or network component with sufficient processing power, memory resources, and network throughput capability to handle the necessary workload placed upon it. FIG. 5 illustrates a typical, general-purpose network component suitable for implementing one or more embodiments of a node disclosed herein. The network component 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor 502 may be implemented as one or more CPU chips, or may be part of one or more application specific integrated circuits (ASICs).

The secondary storage 504 is typically comprised of one or more disk drives or tape drives and is used for non-volatile storage of data and as an over-flow data storage device if RAM 508 is not large enough to hold all working data. Secondary storage 504 may be used to store programs that are loaded into RAM 508 when such programs are selected for execution. The ROM 506 is used to store instructions and perhaps data that are read during program execution. ROM 506 is a non-volatile memory device that typically has a small memory capacity relative to the larger memory capacity of secondary storage 504. The RAM 508 is used to store volatile data and perhaps to store instructions. Access to both ROM 506 and RAM 508 is typically faster than to secondary storage 504.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network component comprising:
   at least one processor configured to:
   assign a plurality of component communications to a plurality of component connections in a composite connection;
   identify a fault in one or more of the component connections affecting one or more component communications; and
   transfer at least one of the affected component communications to a bypass connection, wherein the bypass connection is not part of the composite connection;
   disable an alarm indication signal (AIS) insertion from an egress node for each affected component connection, wherein the AIS insertion indicates a path failure along the affected component connections; and
   generate an ingress AIS for affected component communications only when some of those affected component communication's frames are dropped as a result of not being able to transfer the affected component communications to other component connections, wherein no AIS is generated for affected component communications whose frames are not dropped.

2. The apparatus of claim 1, wherein the bypass connection is selected by the network component or an ingress LP prior to detecting the fault.

3. The apparatus of claim 1, wherein the bypass connection is selected by the network component or an ingress LP subsequent to detecting the fault.

4. The apparatus of claim 1, wherein the bypass connection is specified by a client or an end user prior to detecting the fault.

5. A network comprising:
    an ingress layer processor (LP) configured to distribute a plurality of component communications to a plurality of component connections;
    a composite connection coupled to the ingress LP and comprising a plurality of the component connections and a plurality of intermediate nodes, wherein the composite connection is configured to transport the component communications using the component connections and the intermediate nodes;
    an egress LP coupled to the composite connection and configured to receive the component communications from the component connections; and
    a management entity in communication with the ingress LP, the egress LP, the intermediate nodes, or combinations thereof, wherein the management entity is not one of the intermediate nodes, and
    wherein upon detection of a fault in one of the component connections the ingress LP transmits an alarm indication signal (AIS) to a first intermediate node when the ingress LP is unable to reroute one of the component communications,
    wherein upon detection of the fault in the component connection caused by one or more affected intermediate nodes, the ingress LP is configured to reroute at least some of the affected component communications over a bypass connection that is not part of the composite connection, and wherein no AISs are propagated to the client traffic endpoints by the affected intermediate nodes, and
    wherein the ingress LP is further configured to propagate an AIS to corresponding client traffic end points when at least some of the affected component communication's data packets are dropped as a result of the fault in the component connection.

6. The network of claim 5, wherein upon detection of the fault in one of the component connections, the ingress LP transmits any component communications associated with the faulty component connection over another component connection without generating any AISs.

7. The network of claim 5, wherein upon the notification of the fault in one of the component connections, the egress LP drops all the packets received from the faulty component connection.

8. The network of claim 5, wherein upon detection of faults in all of the component connections, the egress LP generates an AIS for all the component communications.

9. The network of claim 5, wherein upon detection of the fault in one of the component connections, the ingress LP drops a component communication and generates an AIS for the component communication.

10. The network of claim 9, wherein the ingress LP sends an AIS downstream through any available component connection.

11. The network of claim 10, wherein the egress LP collects the AIS and forwards the AIS downstream.

12. The network of claim 5, wherein the management entity is in communication with the ingress LP, the egress LP, and one or more of the intermediate nodes.

13. The network of claim 12, wherein the management entity is isolated from the composite connection such that the management entity does not directly perform any processing of the component communications.

14. The network of claim 5, wherein upon detection of the fault in the component connection, no AIS is propagated to the client traffic end points so long as no traffic is dropped as a result of the fault in the component connection.

15. The network of claim 5, wherein rerouting the corresponding component communication is transparent to client traffic end points.

16. The network of claim 5, wherein rerouting the corresponding component communication is transparent to client traffic end points so long as none of the affected component communication's data packets are dropped as a result of the fault in the component connection.

17. A network comprising:
    a composite link that is a logical link composed of a set of parallel point-to-point component links each of which share the same endpoints;
    a component link that is a point-to-point physical or logical link that preserves ordering in the steady state;
    a flow that is a sequence of packets that must be transferred on one component link to preserve the flow packet sequence; and
    a flow identification comprising a label stack and other information that uniquely identifies a flow, wherein other information in the flow identification may include an Internet Protocol (IP) pseudo-wire (PW) control word or an Ethernet MAC address, wherein the flow identification is used to locally select a component link, or a path through the network toward the destination, and
    at least one component configured to:
    provide a mechanism to select a component link for a flow across a pair of nodes connected by composite links in such a way as to automatically distribute the load over the nodes connected by composite links while meeting all other mandatory requirements;
    ensure that all possible restoration operations happen within a timeframe needed;
    measure traffic on a labeled traffic flow and dynamically select the component link on which to place this flow in order to balance the load so that no component link in the composite link between a pair of nodes is overloaded;
    provide a means that communicates whether the flows within a path is split across multiple component links;
    provide a means to indicate the flow identification fields which is used along the path;
    transmit an alarm to a downstream component when the component link within the composite link fails and the flow is dropped;
    disable an alarm indication signal (AIS) insertion from the downstream component for each affected component link, wherein the AIS insertion indicates a path failure along the affected component links; and
    provide a means local to a node that automatically distributes flows across the component links in the composite link such that all criteria for transporting packets over the composite connection are met.

* * * * *

UNITED STATES PATENT AND TRADEMARK OFFICE
CERTIFICATE OF CORRECTION

| | |
|---|---|
| PATENT NO. | : 8,477,600 B2 |
| APPLICATION NO. | : 12/266700 |
| DATED | : July 2, 2013 |
| INVENTOR(S) | : Lucy Yong et al. |

It is certified that error appears in the above-identified patent and that said Letters Patent is hereby corrected as shown below:

On the Title Page

Item (56), Page 2, Columns 1 and 2, References Cited under Other Publications, the following references should be read as follows:

D. Awduche, L. Berger, D. Gan, T. Li, V. Srinivasan, G. Swallow, "RSVP-TE: Extensions to RSVP for LSP Tunnels," RFC 3209, Dec. 2001.

K. Kompella, et al., "Label Switched Paths (LSP) Hierarchy with Generalized Multi-Protocol Label Switching (GMPLS) Traffic Engineering (TE)," RFC 4206, Oct. 2005.

Faucheur, Ed., "Protocol Extensions for Support of Diffserv-aware MPLS Traffic Engineering," RFC 4124, Jun. 2005.

Schiomoto, K. (Ed.) et al., "Procedures for Dynamically Signaled Hierarchical Label Switched Paths," draft-ietf-ccamp-lsp-hierarchy-bis-05.txt, Oct. 16, 2008.

L. Andersson, G. Swallow, The Multiprotocol Label Switching (MPLS) Working Group decision on MPLS signaling protocols," RFC 3468, Feb. 2003.

Schiomoto, K. (Ed.) et al., "Procedures for Dynamically Signaled Hierarchical Label Switched Paths," draft-ietf-ccamp-lsp-hierarchy-bis-02.txt, Apr. 26, 2007.

Augustyn, W. and Y. Serbest, "Service Requirements for Layer 2 Provider-Provisioned Virtual Private Networks", RFC 4665, Sep. 2006.

Lasserre, M. and V. Kompella, "Virtual Private LAN Service (VPLS) Using Label Distribution Protocol (LDP) Signaling", RFC 4762, Jan. 2007.

Malis, A. and W. Simpson, "PPP over SONET/SDH", RFC 2615, Jun. 1999.

Signed and Sealed this
Seventh Day of October, 2014

Michelle K. Lee
*Deputy Director of the United States Patent and Trademark Office*